Dec. 1, 1953  T. B. HUDSON  2,661,270
MANUFACTURE OF SYNTHESIS GAS
Filed Oct. 14, 1947  3 Sheets-Sheet 2

INVENTOR
THOMAS B. HUDSON
BY Hudson & Young
ATTORNEYS

Dec. 1, 1953        T. B. HUDSON        2,661,270

MANUFACTURE OF SYNTHESIS GAS

Filed Oct. 14, 1947        3 Sheets-Sheet 3

*INVENTOR.*
T. B. HUDSON
BY
*ATTORNEYS*

Patented Dec. 1, 1953

2,661,270

UNITED STATES PATENT OFFICE 2,661,270

MANUFACTURE OF SYNTHESIS GAS

Thomas B. Hudson, Bartlesville, Okla., assignor to Phillips Petroleum Company, a corporation of Delaware Application October 14, 1947, Serial No. 779,787

3 Claims. (Cl. 48—196)

This invention relates to improvements in catalytic processes. More particularly it relates to novel methods of bringing mobile catalysts into contact with reactants. It has particular relevance to organic reactions such as hydrocarbon conversions.

This application is a continuation-in-part of my copending application Serial No. 453,265, filed August 1, 1942, now Patent No. 2,429,161, dated October 14, 1947.

The use of catalysts has come to be of primary importance in industry. Catalysts may greatly accelerate the rate of reaction for many processes so that either a much more rapid conversion at a given temperature is obtained, or a much lower temperature may be used to accomplish a given conversion. In fact in many cases, catalysts of one kind or another have made possible the carrying out of reactions which previously had been believed impossible. While catalytic action cannot cause a reaction to occur which is thermodynamically impossible, it may be the only means of attaining a practical rate of reaction for a given conversion. Utilization of elevated temperatures frequently cannot be relied on due to shifts in equilibrium concentrations or due to the occurrence of undesired side reactions. Many reactions which will not take place at practicable temperature levels with any measurable speed, may occur almost quantitatively at reasonable temperatures in the presence of suitable catalysts.

In the hundred years since Berzelis first recognized the existence of certain reactions which were promoted by substance not changed during the reaction, and suggested the use of the term "catalysis" for describing the forces involved, the search for effective catalytic materials has commanded the attention of a great segment of the technical world. Since the turn of the century, the successful results of these investigations have given rise to numerous new industries, as well as providing greatly improved methods for the older industries.

The petroleum industry may be taken as one outstanding example. Whereas fifteen to twenty-five years ago non-catalytic processes were utilized almost exclusively in all fields of petroleum refining, the trend now is toward catalytic processes, which are rapidly replacing older methods with results which are more satisfactory not only in increased efficiency but also in producing entirely new products. Present day needs call for high-octane gasoline and various other fuels having special requirements. Aviation fuels in particular must now be prepared by blending almost pure individual hydrocarbons or hydrocarbon types in order to meet the demand for fuels which will readily respond to specific operating conditions. Offshoots from the petroleum industry, such as the production of synthetic rubbers, call for preparing very pure single hydrocarbons for use as raw materials.

Not only is the chemical composition of the catalytic material of importance in attaining specific results in chemical conversions, but its physical form, activation treatments, impurities, methods of contacting with reactants, reactivation processes, etc., all exert their influences on the course of the conversions being catalyzed. The particular products and yields thereof obtained are also dependent to a great extent on such reaction conditions as pressure, temperature, time of contact between reactants and catalyst, etc. Careful control of all these variables is required for production of the optimum quantities and quality of products. Organic conversions are particularly susceptible to the effects of these various factors, due to the numerous side reactions which can occur.

One of the most important influences on the course of catalyzed reactions, and frequently one of the most difficult to control, is temperature. Most of such reactions are either highly endothermic or highly exothermic, and maintenance of the desired range of temperature is a major operating difficulty. The activity of a catalyst for a definite conversion is usually of economic significance only within a fairly narrow temperature range, and a particular process using that catalyst must obviously be operated within the active range. This condition is shown by the great change in the degree of conversion usually occurring with relatively small temperature changes.

Thus, in the case of endothermic reactions, the temperature drop which normally occurs may be so pronounced that the rate of conversion will rapidly decrease to an uneconomic level. In the case of exothermic reactions, a rise in temperature normally occurs which, if not controlled in some way, will rapidly bring the temperature to a point at which undesirable side reactions occur. In fact, such side reactions may frequently become the predominant reaction at temperatures only relatively slightly above those required for the desired conversions. Or, the principal reaction may be caused to proceed too rapidly, in which case the reaction rate and temperature become uncontrollable with undesirable or even disastrous results. Accordingly, the careful control of temperature within narrow limits throughout a reaction zone for either endothermic or exothermic reactions is not only highly desirable but is ordinarily a necessity.

Many methods have been offered for the control of temperatures in catalytic conversions, usually involving complicated apparatus designs whereby indirect heat transfer is utilized in connection with portions of catalytic materials so small as to allow sufficient heat to pass from or into the catalyst mass to accomplish the desired results. For example, particles of solid catalyst have been packed into relatively small tubes so that no portion of the catalyst is more than say one inch from a tube wall, and a number of such tubes connected in parallel, with a heat transfer medium being circulated about the exterior of the tubes. An alternative method has been to provide a system of coils or the like within a catalyst mass so that a heating or cooling medium, as required, may be circulated throughout the catalyst bed. Similar arrangements have been provided for reaction vessels employing moving catalysts. However, these methods have not been able to compensate fully for the low thermal conductivity of the usual catalysts. Furthermore, the surface of the tubes or other elements through which the heat transfer takes place, is at a temperature appreciably different from that generally prevailing in the reaction zone. This is disadvantageous, particularly with endothermic reactions where, in the case of hydrocarbon conversions for example, cracking, coke formation and other reactions take place on the superheated surfaces, which causes loss of materials and fouling of equipment.

Other methods proposed for compensating for heat of reaction include superheating of reactants involved in endothermic processes above optimum temperatures, or the converse, that is insufficient preliminary heating of exothermic reactants. The inefficiencies of such methods are obvious. Catalyst poisoning may sometimes occur to an increased extent at either lowered or increased temperature.

Probably the most common method of bringing solid catalysts into contact with reactants is to place the catalyst in a reaction chamber, and pass the reactants therethrough at the desired flow rate, temperature, and pressure. However, in many cases, it has been found useful to cause the solid catalyst particles to move through the reaction zone. Also in the case of gaseous or liquid catalysts, the catalyst is frequently passed through the reaction zone. Such catalysts, whether solid, liquid, or gaseous, which are passed through a reaction zone, are referred to herein as mobile or fluent catalysts. They may be passed either concurrently with or countercurrently to the reactants, depending upon the reactions being catalyzed, the catalyst, and other variables.

It is an object of this invention to provide novel catalytic processes. Another object is to provide improved methods of operating catalytic systems, particularly those employing mobile catalysts. Another object is to enable a more delicate control of catalyzed organic reactions, particularly hydrocarbon conversion. A further object is to provide improved methods of contacting mobile catalysts with reactants. A further object is to provide for the control of catalyzed reactions with respect to temperature and/or products obtained. Yet another object is to permit controlled variation in the quantity and/or activity of catalyst present at all points in a reaction zone. A still further object is to provide for the introduction of one or more catalysts into a reaction zone at a plurality of points. Another object is to provide for the concurrent or countercurrent flow of catalyst thus introduced relative to the flow of reactants. Another object is to correlate the introduction of catalyst with certain reaction conditions in an exact manner so as to compensate, at least in part, for change in temperature and/or change in concentration of reactants or other reaction conditions. A further object is to provide for reactivating catalysts which have become deactivated in such processes so that the reactivated catalyst may be re-introduced into contact with reactants. Yet another object of the present invention is to carry out in an improved manner an endothermic reaction effected at high temperatures under conditions such that the temperature drops along the line of flow of reactants. A still further object is to produce a gas comprising hydrogen and carbon monoxide, which is suitable for use in the synthesis of hydrocarbons, by reaction of methane, steam, and/or carbon dioxide in the presence of mobile heated refractory materials, at least part of the reaction being effected with the aid of a mobile catalyst. Other objects and advantages of the invention will become apparent from the following disclosure.

My invention is essentially a method for carefully controlling catalytic processes by the multipoint addition of catalyst, specifically correlated with reaction conditions. Specific methods of operating are disclosed which are especially adapted for given types of conversions. These different methods, while each employing the introduction of catalyst into a reaction zone at a plurality of points, are not at all to be considered as exact equivalents inasmuch as each is particularly designed to give optimum results for the given application, as will be more fully explained. I am aware that catalytic materials have occasionally in the past been described as being introduced into a reaction zone at more than one point. Such disclosures, however, have been vague, indefinite, and most unenlightening as to the purposes involved and exact results accomplished. I have found specific relationships between catalyst introduction and reaction conditions, and have devised novel methods of correlating the various factors involved whereby new and highly useful results are accomplished, as will be apparent from the detailed teachings hereinbelow set forth.

From one point of view, the invention may be considered as comprising three principal operational modifications. A first modification has to do with catalysts which are miscible with one or more reactants, either by virtue of mutual solubility or because of small particle size of the catalyst allowing its suspension in reactants. Such a suspension may be in a more or less stable form, or in a relatively separable form in which the catalyst is maintained in suspension by means of turbulent flow, static charges, etc. Finely divided solid catalysts are frequently suspended in gaseous reactants and passed through a zone maintained under desired reaction conditions. Such catalysts have been called "fluid catalysts," which is in actuality a misnomer. However, they do often pass at the same rate of flow as the reactants and the entire mixture may be handled more or less as a single fluid. As is well known in the art, the term "fluid" when applied to powdered solid catalysts includes the suspension of same in reactants under conditions of straight-through flow, hindered settling, or even in "fluidized beds." Accordingly, I may define "fluid" catalysts broadly to include not only gaseous and liquid catalysts, but also finely divided solids suspended in reactants. A second modification involves catalysts which are immiscible with reactants undergoing treatment, with the catalyst passing concurrently with the reactants through the reaction zone, generally at a rate different than the rate of flow of reactants. A third modification relates to catalytic materials which are non-miscible with reactants wherein the catalyst after being introduced at a plurality of points subsequently moves countercurrent to the reactants. In some cases there is a combination of the modifications, in which at least one reactant passes countercurrently to at least one other reactant, in which case the catalyst will move concurrently with one reactant and countercurrently to another reactant.

The choice of operating method, and the manner of applying that method, will of course be based on the type of catalyst, reaction, and other factors. However, the choice of points for introduction of the catalyst and the rate at which catalyst is introduced at each point is correlated with change in temperature, change in concentration of reactants, etc., so as to compensate for such changes, as will now be more fully described.

By the use of my invention I may so interrelate the various factors such as temperature, flow rate of reactants, diluents, and catalysts, catalyst activity, time of contact between reactants and catalyst, etc., as to provide a most complete and delicate control over the nature and extent of reaction at all points in the reaction zone.

As pointed out above, temperature control is possibly the major problem in carrying out exothermic and endothermic reactions. The present invention provides methods for maintaining proper reaction velocity in the face of increasing or decreasing temperatures, or of avoiding such increases or decreases in temperature.

In the case of an endothermic reaction, the catalyst may be introduced at a plurality of points spaced in the direction of flow of reactants for concurrent flow therewith. The amount of catalyst is smallest in the first portion of the reaction zone, and largest in the last portion of the zone, due to the incremental additions of catalyst which occur along the path of flow. The temperature at the outlet of the reaction zone is considerably lower than at the inlet because the endothermal reaction takes up heat. The amount of catalyst added at each point is chosen so as to provide sufficient additional catalytic activity to maintain the rate of reaction in spite of the lowered temperature existing at that point. Thus, even though under ordinary conditions the rate of reaction at a temperature, say 50 or 100° F., lower than the optimum reaction temperature would be several times less, resulting in much lowered conversion in the latter portions of the reaction zone, the additional catalyst compensates at least partially for the lowered temperature and may maintain substantially constant conversion throughout the zone if added in sufficient quantity at each point.

Another manner of utilizing this invention for endothermic reactions involves multipoint addition of catalyst with subsequent countercurrent flow relative to the reactants. This may be done especially if the catalyst used undergoes very rapid deactivation at the given reaction conditions. In this case, the rate of introduction and flow of catalyst is regulated so that it is substantially spent, that is, deactivated for the reaction, by the time it exits from the reaction zone. The point of exit of catalyst is at or near the point of entrance of reactants. Accordingly, the reactants first contact a relatively large mass of substantially deactivated catalyst containing only a small proportion of active catalyst introduced at the later (earlier, with respect to reactants) points of the reaction zone. The total activiy is quite limited, and smaller here than at subsequent points. As the reactants pass on through the zone, they contact smaller quantities of total catalyst, but the catalyst contacted has greater activity. The deactivated catalyst also has a diluent effect, and a unit volume of reactants passes through the first portions of the reaction zone more rapidly than it does through the last portions. Flow of reactants continues countercurrent to the flow of catalyst until just before leaving the reaction zone they come in contact with a relatively small quantity of catalyst having very high activity. The increasing catalyst activity thus encountered by the reactants as they flow enable the reaction rate to be maintained in spite of the decreasing temperature caused by the endothermic nature of the reaction. The increments of catalyst added at the points of lowest temperature may, if necessary, be larger than those added at the points of higher temperatures, the quantity added, rate of addition and rate of flow through the reaction zone always being so chosen and related as to compensate at least in part for the variation of reaction rate with temperature. Alternatively, or additionally, catalyst regenerated at a high temperature may be used in such quantities as to maintain reaction temperature constant or to minimize the extent of temperature drop.

An exothermic reaction may be handled in a somewhat different manner, but with the same end in view, namely, the control of catalyst activity and contact time between catalyst and reactants so as to compensate, in part at least, for variation of rate of reaction with temperature. Generally, the most satisfactory control is obtained by use of countercurrent flow of reactants and catalyst introduced multipoint. Reactants first are contacted with a relatively large volume of catalyst, the ratio of catalyst activity to volume of reactants being greatest at this point and progressively decreasing in the direction of reactant flow, while the temperature correspondingly increases. At the higher temperature levels, less catalyst activity is encountered, so that reaction velocity may be maintained as nearly constant as desired. Near the exit from the reaction zone, the reactants are contacted with the smallest quantity of catalyst, this quantity, however, being sufficient to maintain the desired rate of reaction. The advantages of operating in this manner may readily be seen by contrasting with prior methods wherein either the heat of reaction must be removed by difficult means heretofore discussed, or, if the temperature is allowed to increase, contact with equal increments of catalyst combined with the higher temperatures causes greatly increased reaction rates.

Another method of controlling exothermic reactions which is particularly, although not exclusively adapted for use with catalysts which become rapidly deactivated, is the concurrent flow of multipoint-introduced catalyst. In such usage, a first portion of catalyst is introduced either along with the reactant feed or separately into the reaction zone near the point of entrance of the reactants, and the next portion of catalyst, generally smaller, is added at a point at which the first portion is mostly deactivated; at any rate, the relationship of the amount of catalyst thus introduced to the extent of deactivation of previously introduced catalyst is such that the ratio of total catalyst activity to volume of reacants at that point is less than at the earlier point of catalyst introduction the difference being generally inversely proportional to temperature. It would not be at all desirable to introduce catalyst increments of equal activity at equal points while the temperature is rising. As the temperature increases in the direction of flow of reactants, the catalyst activity decreases so as to avoid a constantly increasing conversion rate as would normally be encountered.

The above discussion is directed towards processes carried out under adiabatic, or at least partially adiabatic conditions in which the heat of reaction causes a temperature gradient to exist along the direction of flow of reactants. A combination of indirect heat exchange to partially overcome heat of reaction, with the controlled introduction of catalyst as described above, may be used for exothermic or endothermic reactions.

In case it is desired to maintain substantially isothermal conditions in endothermic or exothermic reactions by means of indirect heat exchange or other methods, this invention may be utilized to obtain a more satisfactory control of reaction and to simplify the temperature control. When reactants are passed through a stationary bed of catalyst, or contacted with a single portion of mobile catalyst, there is a tendency for the reaction to proceed too rapidly at first, with consequent overheating or cooling, as the case may be, at the first point of contact between reactants and catalyst and too rapid catalyst deactivation at that point. However, by adding catalyst to the reaction zone in controlled increments in accordance with my invention, the extent of reaction and temperature may be maintained under strict control since reactants are contacted with a limited portion of catalyst, and are not contacted with an additional portion until the temperature is brought back to the desired value. The catalyst is not added haphazardly, but the addition is carefully correlated with the amount of heat produced or consumed by the reaction and with the amount removed or introduced, so as to avoid localized spots of overheating or excessive cooling. Catalyst and reactants may flow countercurrently or concurrently, depending upon the type of reaction, catalyst, etc., the proper modifications being readily chosen in view of these detailed disclosures offered herein.

Other operating problems frequently encountered in catalytic reactions involve catalyst deactivation and means for avoiding same or for reactivating catalyst, the activity of which has dropped to an uneconomic level. Mobile catalysts are generally subjected to reactivation treatment either after each passage through a reaction zone, or a portion only may be treated each time to keep the overall activity at the desired level. One of the advantages of mobile catalysts over stationary catalysts is that control of regeneration is thus obtained in a fairly simple manner. However, only the overall activity is thus affected, the actual activity at any particular point in the reaction zone being dependent upon conditions therein which are not readily changed with respect to deactivation of catalyst which is occurring. For example, many catalysts will be subjected to a rather extensive deactivation in a relatively small first portion of the reaction zone, due to temperature conditions, poisons, etc., with deactivation in subsequent portions of the reaction zone continuing at a much slower rate. In such a case, it will be seen that while the average or overall activity may be regulated, the uneven loss in activity causes an inefficient operation.

My invention provides a means for controlling the activity of mobile catalysts at any point in a reaction zone. This may readily be accomplished by controlling the quantity and/or activity of catalyst introduced at the different points. Thus in certain cases, partially or completely deactivated catalyst may be admixed in varying proportions with fresh or reactivated catalyst to give the desired activity for introduction at any particular point. In fact, in some cases more than one different type of catalyst may be used for introduction at different points into a single reaction zone to give controlled activity, which may be either maintained constant or varied from point to point to meet the needs of the particular reaction being catalyzed. Examples given herein will serve to point out more clearly a few of the many ways in which controlled variation or constant activity of catalyst is obtained and correlated with other reaction conditions through use of this invention.

Another method by which my invention makes possible a more effective use of catalyst is by controlling the quantity and/or activity of mobile catalyst in a reaction zone in relation to the concentration of reactants existing at various points in the zone. The change in concentration of reactants in a reaction zone depends upon the extent of conversion occurring. If, as in many cases, a substantially complete conversion of reactants to products is desired by the time the reaction mixture leaves the reaction zone, it will be seen that the concentration of at least one reactant must approach zero at the reaction zone exit. In many other reactions, however, an equilibrium may exist which prevents, or economic considerations may make undesirable, a complete conversion. The extent of conversion may vary greatly with the type of reaction being catalyzed, one process involving say a one per cent conversion per pass while another may accomplish forty, sixty, or more per cent conversion in one pass. Ordinarily in case the percentage conversion is low, the loss in concentration of reactants as the reaction proceeds does not greatly affect the reaction rate. However, in the case of higher conversions ranging on up to 100 per cent, the lowered concentrations of reactants existing in the latter parts of the reaction zone may greatly decrease the reaction rate, even though expedients such as using a large excess of one reactant or the like are resorted to. By controlling the multipoint introduction of catalyst in accordance with the decrease in reactant concentration I may partially or completely compensate therefor, and avoid too great or any decrease in reaction rate by providing more catalyst activity at the points of lower concentration. The dilution effect of the catalyst is also to be considered. Again, the catalyst may pass either concurrently or countercurrently to the reactant depending upon the various factors involved for any particular reaction.

It is to be understood that the various methods of utilizing the present invention, that is, for example, by controlling the introduction of catalyst to compensate for changes in temperature, catalyst activity, reactant concentration, etc., may be used either alone or in various combinations, one with the other, as will be well understood by one skilled in the art in view of the full and complete disclosure given herein. Obviously the choice of one or a combination of methods of operating will have to be made with due consideration for the reactions being catalyzed, the type of catalyst most suitable, the extent of reaction, the thermal changes involved, the necessities and possibilities of applying reactivation processes to the catalyst, etc. Various modifications such as introducing diluents, refrigerants, heat carriers, reactants, and the like, multipoint along with or separately from the multipoint-injected catalyst, may be used as found advantageous for any particular process.

A numerical treatment may be used at this point in order to bring out more clearly the hereinbefore discussed principles upon which the invention is based. A number of assumptions will be made to eliminate variables and simplify the presentation. A simple example would be an endothermic conversion involving heterogeneous catalysis, for example the conversion of an organic fluid using a solid contact catalyst in finely divided form. The data below will show how the invention is utilized to maintain a constant reaction rate by overcoming the effects of decreasing temperature, decreasing concentration of reactants, and any deactivation of the catalyst, which would, if the invention were not used but the same total conversion were obtained, cause the reaction rate to drop to a value in the last part of the reaction zone equal to only one-sixth that at the first part of the reaction zone. Assume no change in volume of reactants upon reaction, and assume that doubling the number of particles of catalyst will cause twice as much reaction to occur in a given time due to the doubled area of catalytic contact surface offered the reactants. Let a cylindrical reaction zone through which reactants and catalyst flow concurrently at the same rate be considered as divided into six cylindrical increments of equal volume referred to hereinafter as unit volumes. Let 0.5 unit volume of reactants enter one end of the reaction zone per minute, and a total of 0.5 unit volume of catalyst enter the zone per minute in equal increments of 0.083 volume at each of six equally spaced points; that is, 0.083 volume of catalyst is introduced into each of the six aforementioned incremental unit volumes of the catalyst zone. In the first unit volume of the reaction zone, the ratio of volume of catalyst to volume of reactants is $$\frac{0.083}{1-0.083} = \frac{0.083}{0.917} = 0.09$$

in the sixth and last unit volume of the reaction zone the ratio is $$\frac{0.5}{0.5} = 1.0$$

Thus the ratio of catalyst to reactants at the outlet is $$\frac{1.0}{0.09} = 11 \text{ times}$$

that at the inlet, and accordingly, the effect on the reaction rate would be to increase the rate 11 times. Considering now the contact time, it will be seen on following 0.5 volume of reactants through the catalyst zone that it requires $$\frac{0.917}{0.5} = 1.83$$

minutes to traverse the first unit volume of the zone and $$\frac{0.5}{0.5} = 1.0$$

minute to traverse the last unit volume of the zone. Thus it is seen that the contact time of reactants with the particular amount of catalyst present in the various zones is less in the later increments of the reaction zone than in the earlier increments, and therefore the tendency is for the extent of conversion to decrease. The effect of contact time alone on extent of conversion is equal to $$\frac{1.0}{1.83} = 0.545$$

that is, the conversion would be approximately halved. Taking the two effects of contact time and ratio of catalyst to reactants, the overall tendency toward change in conversion would be approximately expressed as $$\frac{1.0}{0.09} \times \frac{1.00}{1.83} = 6.1$$

These figures indicate quantitatively the tendency toward increased reaction rate caused by the multipoint introduction of catalyst in the exact manner just described, which tendency may be used to maintain a substantially constant overall reaction rate by counteracting the effects of such changes in reaction conditions as drop in temperature due to the endothermal nature of the reaction and/or decrease in concentration of reactants, etc., to the extent that any of such changes in conditions, or the effect of all combined, tend to cause a six-fold decrease in reaction rate. In similar cases in which the depressing influences on the reaction rate are greater or less than six fold, the rate would be held constant by a corresponding increased or decreased overall ratio of catalyst to reactants, or by a controlled change in the activity of catalyst introduced at succeeding points, etc., the exact conditions being calculated in a manner similar to that shown above. Application of this type of procedure to a specific endothermal reaction will be described in more detail hereinbelow with reference to Figure 1. In order to explain the invention more fully, the following examples and appended drawings are provided to illustrate specific embodiments of the process, but no limitations are thereby implied, inasmuch as the invention may be utilized in numerous other manners by following the teachings of this disclosure.

Figure 3 is a diagrammatic drawing of apparatus used for the vapor phase reduction of nitrobenzene with gaseous hydrogen, an exothermic reaction, wherein a metal catalyst supported on a solid granular carrier material is passed concurrently with, but at a different rate than, the reactants.

Figure 1:
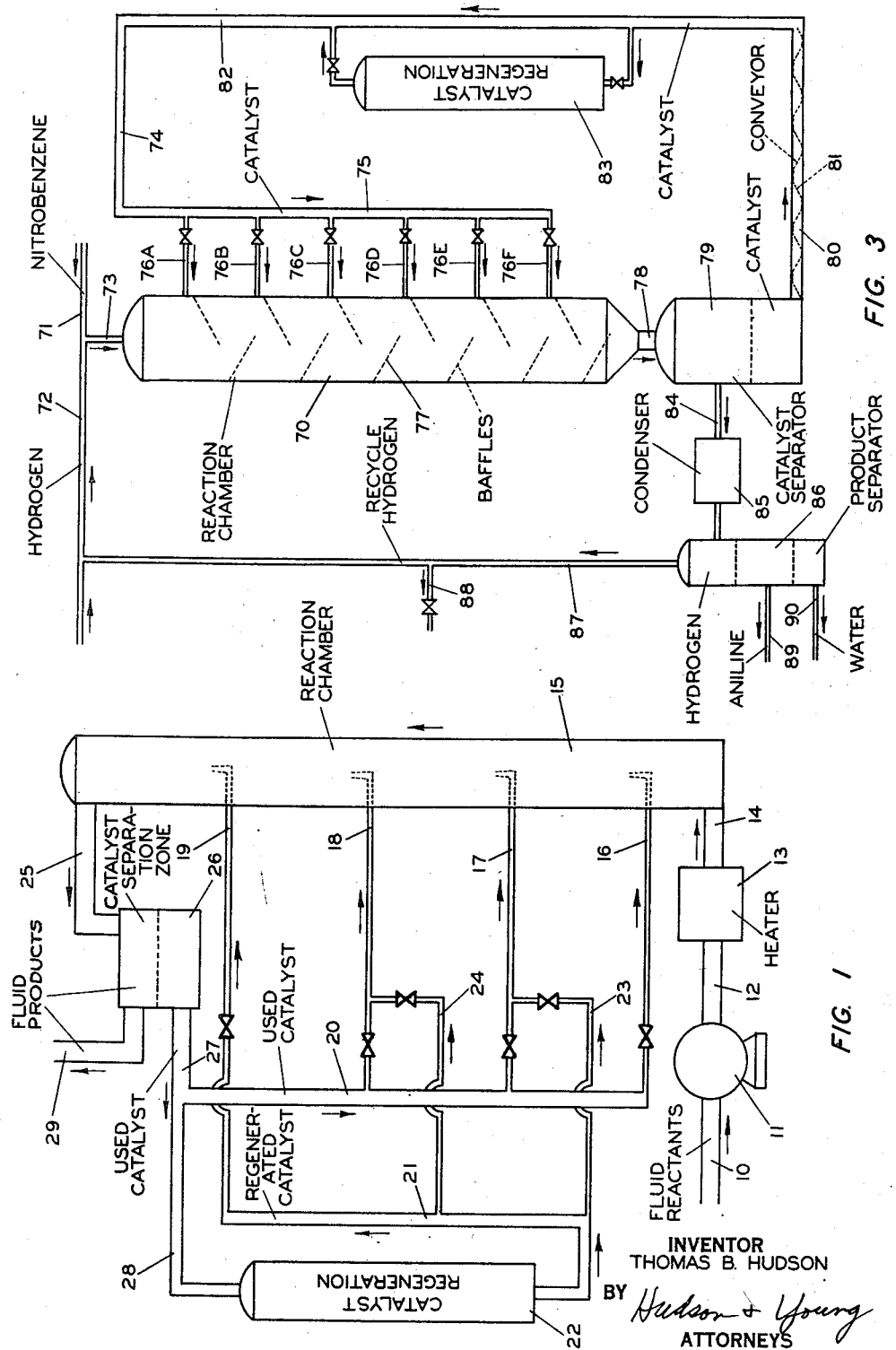
Figure 1 shows in diagrammatic form an arrangement of equipment for carrying out the catalytic cracking of petroleum oils, an endothermic reaction, using a finely divided solid catalyst suspended in vaporous reactants and thus flowing concurrently therewith, commonly termed a "fluid catalyst" process.

In Figure 1, the reactant, for example gas-oil derived by straight-run distillation of crude petroleum, passes from line 10 into blower 11, and thence through line 12 into heater 13 wherein it is raised to a suitable temperature such as 900° F. for the initiation of the reaction upon contact with the catalyst. From heater 13 the heated reactants are sent through line 14 into the reaction chamber 15. This reaction chamber may take the form of an elongated tube, as shown diagrammatically in Figure 1. Various types of reaction chambers suitable for use with powdered catalysts are known in the art. A very finely divided solid catalyst is injected into reaction chamber 15 at spaced points along the path of flow of reactants through lines 16, 17, 18, and 19. Obviously, although only four lines are shown, the number of such lines may be varied at will to obtain suitable operating conditions compatible with economy of equipment. The catalyst may be of the natural clay type such as fuller's earth, bentonite, etc., preferably activated in known manner, or of the synthetic type such as silica-alumina or other effective catalysts known to the art. The method of introducing the finely divided catalyst into the reaction zone may include such operations as suspension in liquid or gaseous reactants or diluents.

The catalyst may enter lines 16, 17, 18, and 19 from two sources. The first source is conduit 20 which carries recycled catalyst which has been partially deactivated by previous use in the process. The second source is conduit 21 which carries regenerated catalyst from catalyst regeneration zone 22. Carbonaceous deposits are removed from the catalyst in zone 22 by burning in an oxygen-containing gas. The quantity of catalyst from each source injected at each point is regulated by suitable means so that all of the catalyst entering through line 16 is the partly deactivated catalyst from conduit 20; most of that entering through line 17 is of the same type, but has admixed with it by means of line 23 a small portion of freshly regenerated catalyst from conduit 21; that entering through line 18 has a larger proportion of reactivated catalyst, which reaches line 18 through line 24; and that entering at the last point through line 19 is composed entirely of regenerated catalyst from conduit 21.

The mixture of products, excess reactants if any, and catalyst passes from reaction zone 15 through conduit 25 into a catalyst separation zone 26, which may be a cyclone separator, electrical precipitator, or any other suitable means for accomplishing the separation of finely divided catalyst from the hot vapors. Catalyst passes from zone 26 into conduit 27 and a portion is taken from conduit 27 through conduit 28 to the catalyst regeneration zone 22. Vapors leave the catalyst separating zone 26 through line 29, and may be condensed and fractionated to separate out the desired cracked gasoline product, with unreacted gas-oil being recycled to the reaction chamber. If desired, various other modifications of such a cracking process which are known to the art, for example recycle of very small amounts of hydrogen, etc., may be used.

The cracking of petroleum oils is an endothermic process, and, as heretofore explained, under ordinary methods of operation a substantial temperature drop occurs which causes a decrease in reaction rate as the reactants proceed through the cracking zone. However, by controlling the relative volumes of partially deactivated and of activated catalyst and also the total volumes of the catalyst introduced into the reaction zone as just described, in conformity with the principles heretofore discussed in detail, the total catalytic activity at each succeeding point in the cracking zone in the direction of flow of reactants is greater than the activity at the preceeding points, the increase in activity being such that the normal decrease in reaction rate accompanying dropping temperatures and catalyst deactivation is partially or completely obviated. This increase in total catalyst activity is obtained by the increasing volume of catalyst due to its multipoint introduction, and the increasing activity of the catalyst introduced, due to the use of relatively greater proportions of freshly reactivated catalyst in the increments introduced along the path of flow of reactants. Of course, the actual quantities of catalyst introduced at the various points will depend upon the catalyst being used, its rate of deactivation under the given reaction conditions, rate of flow of reactants and catalyst, extent of reactivation effected in the catalyst regeneration zone, the characteristics of the gas-oil being cracked, temperature and pressure conditions in the cracking zone, extent of indirect heat exchange occurring between the cracking furnace and any outside sources of heat or cooler surroundings, etc. However, the general principles set out in this disclosure will readily enable one skilled in the art to correlate these various factors for any particular application to obtain the advantages of the invention. Although in the drawing the first point of catalyst introduction into the reaction zone is shown past the reactant inlet, this first point may also be positioned at or just before the inlet so that the first increment of catalyst enters along with the reactants.

It will be noted that in the cracking process as shown in Figure 1, several of the aspects of my invention which were described before in some detail may be involved. For example, the endothermic nature of the reaction will, unless sufficient heat exchange is provided, cause the temperature to drop. The multi-point introduction of catalyst is so controlled as to counter-balance this effect in order to maintain desired reaction velocities. The catalyst during its travel through the cracking zone becomes at least partially deactivated, thus tending to slow the reaction even at constant temperatures. Additional catalyst, including regenerated catalyst, is introduced in such quantities as to compensate for the deactivation occurring in the cracking zone. Another factor tending to decrease reaction rates is the decrease in concentration of reactants which occurs as the reaction proceeds. Since in a gas-oil cracking process of the type described, only partial conversion, say from 15 to 40 per cent, is permitted to occur in one pass, the decrease in reactant concentration does not influence the course of reaction so much as in the case of reactions giving complete conversion in a single pass. However, any effect of this kind is readily overcome by the controlled addition of catalyst at the different points along the cracking zone.

Thus it is seen that in a typical process, gas-oil cracking, control of catalyst addition may be related to several variables. On the other hand, well known expedients might in some cases be utilized to control certain of these variables. For example, sufficient heat may be introduced into the cracking zone by various means as to maintain a substantially constant temperature, although this is difficult to accomplish in actual practice, at least by indirect means. In such a case, catalyst addition at points would be controlled to make up for the combined effects of loss in catalyst activity and change in reactant concentration. On the other hand, reaction conditions may be maintained which are so mild that the amount of catalyst deactivation occurring in a single pass will be very slight, so that the principal purpose of introducing the catalyst at points will be to compensate for decreasing temperatures and/or concentration of reactants in order to maintain a substantially constant reaction rate.

Figure 2:
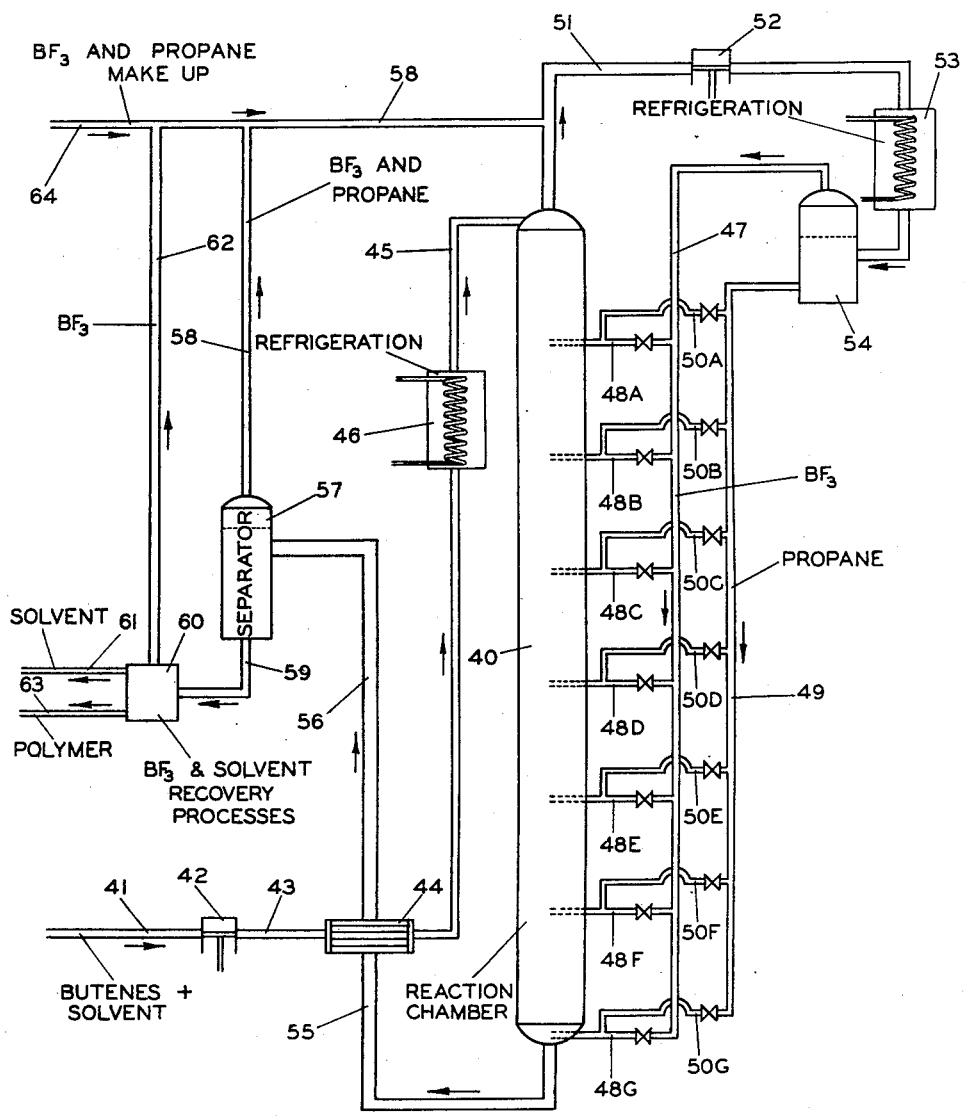
Figure 2 shows diagrammatically apparatus for polymerizing butenes, an exothermic reaction, in which a gaseous catalyst immiscible with the liquid reaction mixture is passed countercurrently to the reactants.

In Figure 2, an elongated reaction chamber 40 is provided, the interior of which may be filled with packing material for promoting intimate contact between gases and liquids. Fed to the system through line 41 is a gaseous hydrocarbon mixture containing a substantial proportion of butenes, preferably isobutylene although normal butenes may also be present. This gas is compressed in compressor 42 and then passes via line 43 to heat exchanger 44 where it is cooled by indirect exchange with effluents from the reaction chamber. From the heat exchanger the cooled hydrocarbons pass via line 45 into the top of reaction chamber 40, wherein they are subjected to the polymerizing action of boron trifluoride ($BF_3$) as hereinafter described. Refrigeration means 46 is interposed in line 45, and serves to cool the reactant feed to the desired reaction temperature, in this case —30° C. The hydrocarbons making up the feed are in liquid phase at this temperature, and the reaction chamber is operated at substantially atmospheric pressure.

Ordinarily a $C_4$ fraction is used which contains substantial amounts of butanes, which serve as a diluent and as a solvent for the high molecular weight polymers formed in the reaction. If such butanes are not available admixed with the butenes, they may be supplied, or pentane or other suitable saturated hydrocarbon solvent may be used. The liquid butenes and accompanying hydrocarbons flow downwardly in chamber 40 countercurrent to gaseous $BF_3$ and gaseous propane, and substantially complete polymerization of the butenes occurs to form polymers of a molecular weight suitable for use as lubricating oils, additives to oils, etc.

The boron fluoride catalyst passes from conduit 47 into reaction chamber 40 at a plurality of points by means of valved lines 48A—48G inclusive. Also introduced into chamber 40 at the same points is liquefied propane from conduit 49 via valved lines 50A–50G inclusive. This liquid propane acts as a coolant, diluent, and dispersant for the $BF_3$, as will be explained in more detail below. Ordinarily a catalyst activator such as hydrogen fluoride, or other materials which will cause the production of hydrogen halides in the reaction zone, is introduced in small amount along with the boron fluoride or otherwise. Furthermore, metallic nickel or other metals are occasionally used in the reaction zone to help catalyze or promote the reaction.

The butenes upon first entering chamber 40 and beginning their downward flow therethrough come into contact with a gas phase which comprises propane and $BF_3$. The volume of the gas phase is greater at this point than at any other point in the chamber. Polymerization is initiated by the catalytic action of the boron fluoride. This polymerization reaction is highly exothermic, and the temperature must be held under very careful control, particularly since the type of product obtained may change greatly with a relatively small change in temperature; that is, the product formed at —30° C. may have an average molecular weight several times that of the product formed at 0° C. For this reason, it is preferred to carry out the reaction as nearly isothermally as possible.

The amount of boron fluoride introduced will ordinarily vary from point to point, being smallest at the top point (conduit 48A) and greatest at the bottom point (conduit 49G). By this multipoint addition of the catalyst, a much more efficient reaction control is realized, since the reactants do not contact the total amount of catalyst at once. The catalyst contacted at the first point comprises not only that introduced through conduit 48A, but also any bubbling up from the lower part of the reaction chamber. Just enough is introduced through line 48A to furnish sufficient fresh catalyst to initiate the reaction to the desired extent. It will be seen that the downward-flowing reaction mixture continuously contacts upwardly flowing catalyst. Due to the formation of complexes between boron fluoride and olefins, a substantial part of the catalyst combines with reactants and is carried down as complex. Such complexes have only a limited amount of catalytic activity, if at all. Thus, if all the catalyst were introduced at the bottom it would be continuously reacting with olefins as it rose through the chamber, and the upper part of the chamber would be deficient in catalyst. In order to ensure that some catalyst reaches the top of the chamber, an otherwise unnecessary excess would have to be introduced at the bottom. Much better results are obtained by the multipoint addition, by which each increment added to the gas phase flowing upward through the reaction chamber can be controlled in amount to give just the desired concentration of catalyst at the given point. It is preferable that the amount of catalyst be relatively small at the top of the chamber where the reaction starts, since the major part of the reaction and thus heat evolution generally occurs in the upper half of the chamber where the greatest concentration of monomers is found.

The introduction of controlled amounts of cold liquid propane at points along with the catalyst gives effective control of temperature throughout chamber 40. The propane vaporizes immediately upon entering the chamber, and in so doing absorbs the heat of reaction. Of course, additional indirect heat exchange may be provided for chamber 40 to assist in removing the heat of reaction if desired, particularly in order to avoid having too large an amount of gaseous propane passing through the reactor. A convenient way to do this is to pass chilled liquid propane through coils in chamber 40 in indirect heat exchange with the reactants, and then to pass the desired amount of the propane into conduit 49 for direct introduction through conduits 50A, 50B, etc.

Since the amount of BF₃ used is only a small percentage of the hydrocarbons charged, say from 0.5 to 5.0 mol per cent, the propane gas is very effective in promoting a more thorough dispersal of the catalyst throughout the reaction zone. It also serves as a diluent both for the liquid reactants and for the gaseous BF₃. For this reason, larger amounts of BF₃ may be passed through reaction chamber 40 thus admixed with propane than would be suitable in the absence of the added gas. This excess BF₃ is recovered and recycled. The amount of liquid propane added through the lower conduits, for example, 50G to 50F, is less than that added through the upper conduits such as 50A and 50B. This is because more heat of reaction is developed at the top of chamber 40 than at the bottom, and more evaporation of propane is needed at the top to maintain the desired low temperature.

Flow rate of reactants through chamber 40 is preferably such that substantially no unpolymerized butenes are present in the effluents and the polymers in the effluents are predominately of high molecular weight, for example over 2000. The character of the polymers can be controlled to a certain extent by controlling the reaction time and thus the extent of conversion, although a change in operating temperature will generally have more influence on the final product. A short conversion time will ordinarily produce some of the high molecular weight polymers, with a larger percentage of intermediate polymers which may be used for different purposes or which may be recycled to reaction chamber 40. The volume of propane gas passed through reaction chamber 40 will generally be several times the volume of liquid reactants and solvent passed through the chamber in a given time.

Propane gas and boron fluoride gas leaving the top of chamber 40 via line 51 are compressed in compressor 52, chilled, by partial evaporation in known manner, if desired, in refrigeration means 53 to condense liquid propane, and then passed to accumulator 54. Cold gaseous boron fluoride leaves the top of accumulator 54 through line 47 for re-use in the process, while cold liquid propane leaves the bottom of accumulator 54 by line 49 to be introduced into chamber 40 as described above. Of course, the gas phase from accumulator 54 contains some propane, and the liquid phase contains some boron fluoride in solution.

Since butenes are appreciably volatile at the temperature of operation of chamber 40, the gas leaving that chamber via line 51 has some butenes in it, and these butenes tend to undergo some polymerization in line 51 and compressor 52. For this reason, it is desirable that the length of line 51 between chamber 50 and compressor 52 be short, and that the line 51 and compressor be flushed periodically with a solvent for the polymers such as liquid butane. Not much trouble is experienced from compressor 52 on, since liquid propane is present which acts as solvent. The amount of polymer formed is small compared to the amount of butenes passing through this part of the system, most of the butenes returning unchanged into reaction chamber 40 along with the propane. A very satisfactory way to obviate any difficulty in this regard is to wash the gas in line 51 with sufficient liquid butane or pentane to remove practically all of the butene. The liquid may then flow directly into chamber 40. This modification is not shown in the drawing for the sake of simplicity.

Liquid products leave the bottom of reaction chamber 40 through line 55 and pass through line 55 and pass through heat exchanger 44 to be warmed to a higher temperature and to cool the incoming butenes. From exchanger 44 the products pass via line 56 to separator 57 wherein dissolved and/or entrained boron fluoride and propane gas are evolved, which pass via line 58 to line 51 for recovery and re-use. Liquid products pass from separator 57 via line 59 to boron fluoride and solvent recovery means which are indicated diagrammatically at 60. The solvent, which ordinarily is butane, is recovered by evaporation and leaves the system through line 61. Part or all of the solvent may of course be recycled to line 41 or elsewhere if desired. Boron fluoride is recovered from its complexes by heating or other means, and is returned to the system by lines 62, 58, and 51. Ordinarily heating the product to 125° C. or higher will serve to release at least part of the boron fluoride from the hydrocarbons. Polymer is removed from the system at 63. Any make-up BF₃ and/or propane required may be supplied through line 64.

The above-described process exemplifies an adaptation of my invention to a highly exothermic reaction wherein the temperature is maintained constant. The multipoint addition of catalyst is controlled with respect to two principal variables. One is the loss of catalyst by complex formation. Catalyst is added at points to maintain the desired amount of active catalyst. The other is change in concentration of reactants. The smallest concentration of catalyst is maintained at the point of greatest concentration of butenes, while the greatest concentration of catalyst is at the outlet where reaction is being completed with practically no butenes remaining. It is to be noted that due to the diluent effect of the gaseous propane, the actual quantity of catalyst may under certain conditions be greater at the top point than at the bottom point, but the ratio of catalyst activity to reactants decreases from bottom to top, the diluted catalyst having less effect than the undiluted catalyst. The catalyst activity thus changes in relation to the extent of reaction, to compensate at least in part for the tendency toward decreased reaction rate.

An important aspect of the polymerization process as described is the fact that, while actual cooling is accomplished by the propane, temperature control is effected to a large extent by the multipoint addition of the catalyst. This is because the rate of addition of catalyst at each point is so controlled and correlated with the other factors that catalyst activity at the point of greatest tendency toward heat evolution, that is the butene inlet, is smaller than at any other point, and the catalyst activity is increased as the tendency toward heat evolution decreases. The entire process may be contrasted with the prior art methods wherein the boron fluoride is added all at one point with consequent violent reaction at that point with little or no reaction at other points or wherein inefficient batch methods are employed with vigorous stirring, gradual addition of catalyst and/or reactants is resorted to, and the reaction time is unduly extended because of the inherent limitations of that method of operating.

In Figure 3, the reaction chamber 70 is preferably provided with means (not shown) for removing at least most of the heat of reaction by indirect heat exchange. A certain amount of heat is also lost to the atmosphere, but in order to avoid uneven cooling the entire chamber is ordinarily provided with some insulation. Heated vaporized nitrobenzene from line 71 and hydrogen from line 72 join in line 73, and flow into reaction chamber 70 for downward flow therethrough. The hydrogen may be admixed with substantial amounts of carbon monoxide, or with inert gases such as methane or nitrogen. In fact, in carrying out the reduction of nitrobenzene in accordance with the present invention, I prefer to have some inert gas with the hydrogen. The ratio of hydrogen to nitrobenzene must be held within relatively narrow limits to obtain the highest yield of aniline, since a ratio considerably higher or lower than the stoichiometrical amount gives rise to reduction products other than aniline. It is best to have somewhat more than the theoretical ratio of hydrogen to nitrobenzene, but not too much more, in order to ensure completion of the reaction, and some inert gas is preferably used in admixture with the hydrogen.

A suitable supported hydrogenation catalyst in granular form is caused to pass through conduit 74 into manifold 75. Branching off from manifold 75 are branches 76A–76F inclusive through which the catalyst is introduced into the reaction chamber 70 at spaced points along the path of flow of reactants. The quantity of catalyst introduced through each branch 76A, etc., may be controlled by any suitable means. It will be appreciated that due consideration must be given to the fact that chamber 70 is operated under pressure. The lines, 76A to 76F inclusive, are shown equally spaced; however, the lines may be more or less in number, and evenly or unevenly spaced, in accordance with the capacity of the system, convenience of fabrication, operating conditions, rate of catalyst introduction at the various points, and economy of equipment. A series of baffles 77 is provided in chamber 70 to keep the catalyst particles dispersed and in good contact with reactants as the catalyst falls to the bottom of chamber 70. The baffles preferably have only a slight inclination from the horizontal so that catalyst is more or less pushed off of one baffle down to the next by incoming catalyst.

In the hydrogenation of nitrobenzene by prior methods, the reaction mixture is passed through a stationary bed of catalyst. Since the concentration of reactants is greatest in the first portions of the catalyst bed, the major part of the reaction occurs before the bed is halfway traversed. This means that the amount of heat liberated in the upper parts of the catalyst chamber is greater than in the lower parts, and thus the load on heat exchange coils or the like with which the chamber may be provided is greatest at the top and least at the bottom. Thus the heat exchange means must either be oversized at points or is overloaded. In practical operation, the heat of reaction cannot be satisfactorily removed, and a serious temperature rise occurs. This is very undesirable, since the optimum yield of aniline, when using any given catalyst, is obtained only in a relatively narrow temperature range. Sintering of catalyst is also likely to occur on the most active catalytic points where the actual temperature may be from 25 or 50 to a hundred or so degrees centigrade higher than the mean temperature of the reactants and catalyst near those points. A further disadvantage lies in the fact that the temperature rise serves to increase the already excessive reaction rate still more.

By means of my invention the catalyst addition is controlled in accordance with the rate of reaction or rate of evolution of heat, so that substantially equal, or at least regularly varying quantities of heat are evolved and removed along equal increments of the length of reaction chamber 70. Thus, in the first part of reaction chamber 70, a relatively small amount of catalyst is introduced through branch 76A. Since the highest concentrations of nitrobenzene and of hydrogen are found in this portion of the reaction zone a small amount of catalyst is sufficient to promote considerable reaction. As the reaction rate tends to lessen due to the diluent effects of the aniline formed, or stated another way, due to the lowered concentrations of nitrobenzene and hydrogen, additional catalyst enters the reaction zone through 76B, and the reaction rate tends to increase again. Thus, the quantity of active catalyst surface present at various points in reaction chamber 70 is maintained sufficiently, as the reactants flow therethrough, so as to give a completely reduced product in the effluents. The amount of catalyst in the parts of chamber 70 is small at the inlet thereof, and increases gradually toward the outlet, where it reaches a maximum. The reaction rate is maintained more or less constant throughout the reaction zone, in contrast to other methods wherein the last half of the catalyst chamber may be used for effecting only five or ten per cent of the total conversion. The temperature may be maintained substantially constant due to the fact that the amount of heat liberated is not excessive at any point, or a gradual temperature gradient may be allowed to exist, an increase of say 50° C. from the inlet to the outlet being permissible without undesirable effects. It is to be noted however, that in using my invention, such a temperature gradient is regular, and is obtained gradually as the reactants flow through the apparatus, rather than being obtained all at once as by other methods, in which case a peak temperature may even occur, with a subsequent falling off in the latter stages where very little reaction is occurring.

A certain amount of catalyst deactivation will occur which tends to lessen the reaction rate, and this is also compensated for by the fresh catalyst added. The rate of catalyst deactivation will of course depend upon the catalyst used, the severity of reaction conditions, and particularly upon the purity of the reactants. Generally, the amount of catalyst poisons present in the nitrobenzene and hydrogen gas is small, and catalyst deactivation is not of great consequence in lessening the reaction rate in the passage of catalyst from one point to the next in reaction chamber 70. The relative rates at which catalyst is introduced at the various points will be determined as described above with reference to control of rate of reaction, while the total rate of catalyst flow into and thence out of chamber 70 will generally be chosen with respect to the type of reactivation treatment to which the catalyst is subjected outside the chamber. It is usually preferable to reactivate the catalyst before it has lost too much of its activity, since considerably higher temperatures frequently must be used in the reaction zone with a less active catalyst. Thus it is seen that a continuous flow of catalyst is maintained through chamber 70 so that the catalyst as removed from the bottom thereof is usually still fairly active. The rate of flow of gaseous reactants through the catalyst chamber 70 will be many times greater, on a volume basis, than the rate of flow of catalyst therethrough.

The total effluent from reaction chamber 70 passes out through conduit 78 and then to catalyst separator 79 where the catalyst separates from the gases by gravity. This catalyst is removed through conduit 80 containing suitable conveying means such as screw 81. From 80 the catalyst passes through conduit 82 to conduit 74 for re-use in the process. A portion of the catalyst stream may be continuously by-passed through a regeneration zone indicated diagrammatically at 83 to maintain the total catalyst stream at the desired activity. The regeneration in zone 83 comprises conventional chemical treatments to remove accumulated impurities and to restore the catalyst to substantially its original conditions. The entire stream of catalyst, rather than a portion, may be passed through regeneration zone 83 if desired.

The gases in catalyst separator 79 comprise aniline produced in the process, any traces of unreduced nitrobenzene, steam formed as a by-product, any excess hydrogen, and any inert gas introduced along with the hydrogen. This gas phase is passed via line 84 through cooler 85 and into product separator 86, wherein a liquid water-rich phase, a liquid aniline-rich phase, and a gaseous phase separate out. The gas is recycled via line 87 to line 72 for re-use of the hydrogen in the process. In order to prevent inert gases from pyramiding in the system, a portion of the gas is allowed to leave line 87 through valved branch 88. The aniline is removed from separator 86 through line 89 and passed to suitable apparatus for removing dissolved water and any other impurities. Water is removed from separator 86 through line 90, and passed to a system for recovering dissolved aniline therefrom. One very effective method of accomplishing this is to extract the aniline from the water with nitrobenzene, the extract then being led to the reaction zone for reduction of the nitrobenzene.

Suitable catalysts for the reduction of nitrobenzene according to the system just described may comprise metals such as gold, silver, nickel, copper, or tin, either alone or in admixture, and preferably supported on granular carriers such as pumice, porcelain, alumina, etc. It is necessary that the catalyst composition have sufficient mechanical strength for withstanding the effects of continuously moving through the equipment. A preferred catalyst comprises supported tin prepared from the precipitated hydroxide or carbonate. With such a catalyst, an operating temperature in reaction chamber 70 in the range of about 275° C. to 375° C. is suitable.

Figure 4:
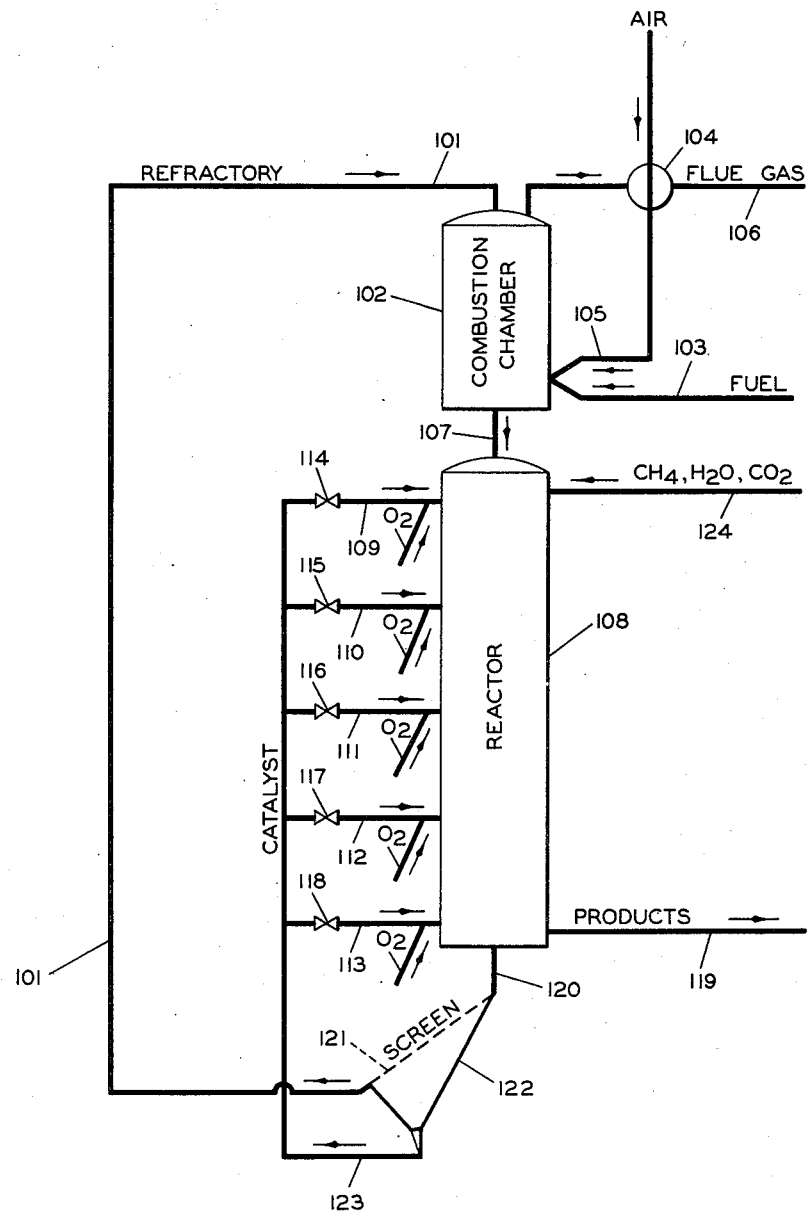
Figure 4 is a diagrammatic illustration of one form of apparatus and flow of materials therethrough for the manufacture of synthesis gas (containing carbon monoxide and hydrogen), wherein a concurrent flow of catalyst and reactants together with heated refractories is employed.

Figure 4 illustrates the application of certain principles of the invention to the manufacture of synthesis gas. In the synthesis gas reaction, wherein carbon monoxide and hydrogen are prepared for use in the synthesis of liquid fuels by the Fischer-Tropsch reaction or for other uses, it is desirable to eliminate all possible nitrogen and other diluents from the product gas. This is accomplished in the process to be described wherein air is used for heating purposes but without diluting the product with nitrogen and without the necessity of supplying large amounts of high purity oxygen for the reaction. In this process the catalyst is subjected to a relatively small amount of coking, even though the reaction is carried out in part at lower temperatures at which coking usually becomes excessive. In Figure 4, a refractory, preferably in pebble form of one quarter inch to one inch in diameter, is introduced through conduit 101 to a combustion chamber 102 where it is heated to 2,000 to 2,800° F. by the burning of a fuel in air. The fuel is introduced through conduit 103 and the air, which may be preheated as in exchanger 104, is introduced through conduit 105. The refractory is continuously conducted through the combustion chamber and drops by gravity via line 107 into the reactor 108 where it supplies the heat of reaction for the reforming of the natural gas with steam and/or carbon dioxide. These reactants enter the top of reactor 108 through conduit 124 and pass downwardly through the reactor concurrently with the refractory. Said reactants may be preheated in a suitable heat exchanger (not shown) to any desired degree or may enter cold; upon meeting the hot refractory, the reactants are heated to 1,800 to 2,500° F., at which temperature they begin to react. With no catalyst present the reaction will not proceed below a temperature of approximately 1,800° F. For this reason a suitable catalyst, preferably in the form of quite small pebbles or powder, is injected through conduit 109 into the moving refractory and stream of reactants at an upper point of the reactor 108. Because of the presence of catalyst, additional reaction will occur and thereby lower the temperature still further because of the endothermic nature of the reaction, dilute the reactants with products, and reduce the catalyst activity by coking. In order to overcome the effect on extent of reaction of the loss in temperature, the reduced catalyst activity, and the dilution, additional catalyst is injected through conduit 110 at a point somewhat lower in the reactor. This procedure is continued throughout the length of the reactor, additional catalyst being injected as desired through similar conduits as represented in the drawing by lines 111, 112, and 113. Catalyst flow through lines 109 to 113 may be suitably regulated by star valves 114 to 118 or by other suitable mechanisms. The products are withdrawn as gases through line 119 at the bottom of the reactor and are subjected to suitable treatment (not shown) prior to employing these products in the Fischer-Tropsch synthesis. The ultimate ratio of $H_2$ to CO in the synthesis gas product is preferably about 2:1 for most purposes. The refractory pebbles and catalyst exit from the reactor through conduit 120 and are separated one from the other by screen 121 so that the refractory pebbles are conveyed through the conduit 101 to the top of the combustion chamber to start a new cycle while the catalyst particles are collected in hopper 122 and conveyed through conduit 123 to the injection lines 109 to 113 for repeating their cycle through the reactor.

By separating the refractory heat carrier from the catalyst, the catalyst injection may be actuated and controlled by known devices built of standard high-temperature materials. If the catalyst were heated along with the refractory to some temperature in the neighborhood of 2,000° F., it would be extremely difficult to find satisfactory means of injecting the catalyst in a controlled fashion since such a temperature would be too hot for present day structural metals. This is a marked advantage of the particular procedure just described.

High purity oxygen may be added to each stream of catalyst just before the catalyst enters the reactor in order to burn off the carbon that may have been deposited thereon during the reaction. Such oxygen is added downstream from the control devices 114 to 118 by means of the lines shown on the drawing in order to prevent raising the temperature of the catalyst above a safe operating temperature for said control devices. By using high purity oxygen instead of air, any additional dilution of the reaction by combustion products is avoided.

One modification of the above described invention includes the addition of enough oxygen over and above that required for the removal of the carbon from the catalyst to supply sufficient heat, by reaction with the methane or natural gas, to keep the reaction mass at a constant temperature level throughout. In this modification the additional catalyst added at the various levels is controlled to off-set the effects of dilution of the reactants by products, or in other words the effect of decrease in concentration of reactants, and also to off-set the reduction in activity of the catalyst that has been added at a higher level.

In some instances it may be desirable to introduce the refractory at high enough temperature that reaction will proceed for a while without a catalyst. In this case, the upper portion of the reactor may be left without any catalyst by simply stopping the injection mechanism or the controlling devices and allowing the reaction to proceed downward through the reactor until the temperature is lowered almost to 1,800° F. because of the endothermic reaction; catalyst may then be introduced in order to continue the reaction below that temperature as described above.

A further modification, not shown in the drawings for the sake of simplicity, involves the injection of both catalyst and refractory at a plurality of points, both the refractory and catalyst having been heated together to the desired temperature. In this case, moving control devices to regulate the flow of hot solids into the reactor at each level are not completely satisfactory because of the high temperatures of the refractory and catalyst. Regulation can be accomplished by an obstruction of a refractory material built into each conduit in such a fashion that the obstruction can be adjusted any time the unit is not operating. By this modification the temperature of the reaction mass can be kept as nearly constant as desired by adding the heat carrying solids to off-set the heat absorbed by the endothermic reaction. The additional catalyst which enters at each level is so controlled in amount as to off-set by increased catalyst concentration, the dilution effect of the product formed and the loss in activity experienced by the catalyst previously added. It is obvious that the catalyst would be regenerated by its passage through the combustion zone and therefore would be fresh when injected on each cycle. Various catalysts for the synthesis gas reaction are well known in the art and hence need not be listed in detail. The preferred catalyst in my operation is nickel oxide, while iron oxide and other catalysts, solid or non-solid and in various forms, may be used.

The applicability to the manufacture of synthesis gas of various other modifications of the invention as described in general hereinabove will be obvious, and the description just completed is exemplary of preferred modifications and is not all-inclusive. Thus the procedure described above with respect to Figure 1 is advantageously applied to the synthesis gas reaction, whereby the catalyst is withdrawn from the reactor in a partially deactivated condition, a portion is recycled to the reactor at several points including the first and excluding the last and in increasing amounts without reactivation, while another portion is reactivated and then introduced into the reactor at a plurality of points excluding the first but including the last, with increasing amounts of the reactivated catalyst along the line of flow. The catalyst activity is thus readily caused to increase in the direction of flow of reactants and thereby overcome to any desired extent the effects of decreasing temperature and decreasing concentration of reactants and the effects of the decrease in catalyst activity which would otherwise occur in the absence of such practice.

Various modes of operating have been disclosed herein, along with the broad concepts involved, so that one skilled in the art may, by suitable simple modifications, apply the principles of my invention to conform to the economic and practical considerations which will vary somewhat with each particular material treated. By following the teachings of my invention, the contacting of catalysts with reactants may be so exactly correlated with reaction conditions as to give a well regulated operation not heretofore taught. While I have disclosed certain specific processes, with particular reference to petroleum conversions, I do not wish to be limited to the exact modifications described, but only by the appended claims.

I claim:

1. In the manufacture of synthesis gas by the reaction of methane with steam to form a synthesis gas containing hydrogen and carbon monoxide with the hydrogen being in molar excess of the carbon monoxide, the improvement which comprises passing a reaction mixture comprising methane and steam downwardly through a vertical reaction chamber, passing downwardly through said chamber a mass of preheated refractory pebbles at an inlet temperature sufficient to effect the desired reaction, flowing the reaction mixture and pebbles concurrently through said reaction zone whereby the temperature in the direction of flow decreases due to the endothermic nature of the reaction, introducing catalyst for said reaction into said reaction zone for downward flow therethrough, said catalyst being introduced at a plurality of points spaced along the line of flow and being admixed with said pebbles and reaction mixture in said zone, separately regulating the quantity and activity of the catalyst introduced at each of said points so as to provide an increasing catalyst activity in the direction of flow, said increasing activity tending to counteract the depressing effect of said decreasing temperature on the extent of reaction in the lower portions of said reaction zone, recovering said pebbles from the bottom of said reaction zone, reheating same, and reintroducing same into the top of said reaction zone in a continuous cycle, separating said catalyst from admixture with said pebbles, subjecting a portion of said catalyst to reactivation while returning the remaining portion to the reaction zone without reactivation, introducing said unreactivated catalyst into said zone at a plurality of the aforesaid points including the first and excluding the last of said points in the direction of flow, the unreactivated catalyst introduced to said first point being the sole catalyst introduced thereto and a diminishing quantity of unreactivated catalyst being introduced at each succeeding point in the direction of flow, introducing said reactivated portion of said catalyst into the reaction zone at a plurality of points excluding the first and including the last of said points in the direction of flow, the reactivated catalyst introduced to said last point being the sole catalyst introduced thereto and an increasing quantity of reactivated catalyst being introduced at each succeeding point in the direction of flow, and so portioning the relative amounts of unreactivated and reactivated catalysts introduced at the respective points as to maintain an increasing catalytic activity in the direction of flow such as to establish a substantially constant extent of reaction throughout the reaction zone despite said decreasing temperature, otherwise decreasing catalyst activity, and decreasing concentration of reactants.

2. In the manufacture of synthesis gas by the reaction of methane with steam to form a synthesis gas containing hydrogen and carbon monoxide with the hydrogen being in molar excess of the carbon monoxide, the improvement which comprises passing a reaction mixture comprising methane and steam downwardly through a vertical reaction chamber, passing downwardly through said chamber a mass of preheated refractory pebbles at an inlet temperature sufficient to effect the desired reaction, all of said pebbles being introduced at the top of said reaction zone, flowing the reaction mixture and pebbles concurrently through said reaction zone whereby the temperature in the direction of flow decreases due to the endothermic nature of the reaction, introducing catalyst for said reaction into said reaction zone for downward flow therethrough, said catalyst being of a different particle size from said refractory pebbles, said catalyst being introduced at a plurality of points spaced along the line of flow and being admixed with said pebbles and reaction mixture in said zone, separately regulating the quantity and activity of the catalyst introduced at each of said points so as to provide an increasing catalyst activity in the direction of flow, said increasing activity tending to counteract the depressing effect of said decreasing temperature on the extent of reaction in the lower portions of said reaction zone, separating refractory pebbles from catalyst after passage through said reaction zone by virtue of the difference in particle size, introducing thus separated catalyst into said reaction zone at said plurality of points, subjecting catalyst being introduced into at least some of said points first to contact with substantially pure oxygen to remove carbonaceous matter from said catalyst by combustion thereof, and introducing the thus treated catalyst and resulting combustion products together into said reaction zone.

3. In the manufacture of synthesis gas by the reaction of methane with steam to form a synthesis gas containing hydrogen and carbon monoxide with the hydrogen being in molar excess of the carbon monoxide, the improvement which comprises passing a reaction mixture comprising methane and steam downwardly through a vertical reaction chamber, passing downwardly through said chamber a mass of preheated refractory pebbles at an inlet temperature sufficient to effect the desired reaction, flowing the reaction mixture and pebbles concurrently through said reaction zone whereby the temperature in the direction of flow decreases due to the endothermic nature of the reaction, introducing catalyst for said reaction into said reaction zone for downward flow therethrough, said catalyst being introduced at a plurality of points spaced along the line of flow and being admixed with said pebbles and reaction mixture in said zone, separately regulating the quantity and activity of the catalyst introduced at each of said points so as to provide an increasing catalyst activity in the direction of flow, said increasing activity tending to counteract the depressing effect of said decreasing temperature on the extent of relation in the lower portions of said reaction zone, subjecting catalyst being introduced into at least some of said points first to contact with substantially pure oxygen to remove carbonaceous matter from said catalyst by combustion thereof, and introducing the thus treated catalyst and resulting combustion products together into said reaction zone.

THOMAS B. HUDSON.

References Cited in the file of this patent

UNITED STATES PATENTS

| Number | Name | Date |
|---|---|---|
| 2,425,754 | Murphree et al. | Aug. 19, 1947 |
| 2,440,475 | Jacomini | Apr. 27, 1948 |
| 2,441,170 | Rose et al. | May 11, 1948 |
| 2,490,336 | Crowley, Jr. | Dec. 6, 1949 |
| 2,555,210 | Waddill et al. | May 29, 1951 |

FOREIGN PATENTS

| Number | Country | Date |
|---|---|---|
| 411,477 | Great Britain | June 4, 1934 |